United States Patent
Shang

(10) Patent No.: US 12,034,819 B2
(45) Date of Patent: Jul. 9, 2024

(54) RECOMMENDATION METHOD FOR AN INTERNAL SERVICE ENTITY SERVICE ENTRANCE OF NETWORK PLATFORM

(71) Applicant: SHENZHEN SEKORM COMPONENT NETWORK CO., LTD, Guangdong (CN)

(72) Inventor: Lianglei Shang, Guangdong (CN)

(73) Assignee: SHENZHEN SEKORM COMPONENT NETWORK CO., LTD, Shenzhen (CN)

(*) Notice: Subject to any disclaimer, the term of this patent is extended or adjusted under 35 U.S.C. 154(b) by 0 days.

(21) Appl. No.: 17/420,387

(22) PCT Filed: Jun. 30, 2020

(86) PCT No.: PCT/CN2020/099412
§ 371 (c)(1),
(2) Date: Feb. 24, 2023

(87) PCT Pub. No.: WO2022/000303
PCT Pub. Date: Jan. 6, 2022

(65) Prior Publication Data
US 2023/0199076 A1  Jun. 22, 2023

(51) Int. Cl.
*G06F 13/00* (2006.01)
*G06F 40/284* (2020.01)
*G06F 40/289* (2020.01)
*H04L 67/51* (2022.01)

(52) U.S. Cl.
CPC ........... *H04L 67/51* (2022.05); *G06F 40/284* (2020.01); *G06F 40/289* (2020.01)

(58) Field of Classification Search
CPC ...... H04L 67/51; G06F 40/284; G06F 40/289; G06F 40/242; G06F 16/33; G06F 16/9535
USPC .......................... 709/223, 224, 231
See application file for complete search history.

(56) References Cited

U.S. PATENT DOCUMENTS

| 10,984,191 | B2* | 4/2021 | Hewitt | G06F 40/268 |
| 11,227,127 | B2* | 1/2022 | Kumar | G06F 40/30 |
| 11,636,270 | B2* | 4/2023 | Lin | G06F 16/55 |
| | | | | 704/9 |
| 2020/0104356 | A1* | 4/2020 | Hewitt | G06F 40/205 |

(Continued)

FOREIGN PATENT DOCUMENTS

| CN | 102306201 A | 1/2012 |
| CN | 102915357 A | 2/2013 |
| CN | 102915358 A | 2/2013 |

*Primary Examiner* — Kenneth R Coulter

(57) ABSTRACT

The invention relates to a recommendation method for an internal service entity service entrance of a network platform. The method comprises the following steps of: S1, sending service keywords of each service entity as a word source of tokenizer to the tokenizer of a network platform; S2, sending a core corpus corresponding to each network content in the network platform to a tokenizer, wherein the core corpus is the core content of the network content; S3, carrying out word segmentation on that core corpus by the tokenizer, and matching with the service keywords after the word segmentation is completed; S4, if the participle of the core corpus is matched with the service keywords, setting a service entrance of the service entity corresponding to the matched service keywords in the network content corresponding to the core corpus.

16 Claims, 2 Drawing Sheets

(56) References Cited

U.S. PATENT DOCUMENTS

2021/0089627 A1\* 3/2021 Kumar .................. G06F 40/284
2021/0232770 A1\* 7/2021 Lin ........................ G06V 10/40

\* cited by examiner

RECOMMENDATION METHOD FOR AN INTERNAL SERVICE ENTITY SERVICE ENTRANCE OF NETWORK PLATFORM

TECHNICAL FIELD

The invention relates to the field of internal data management of a network platform, in particular to a recommendation method for an internal service entity service entrance of a network platform.

BACKGROUND OF THE INVENTION

The inside of a network platform comprises a plurality of web pages and a large amount of data, wherein in order to facilitate a user to quickly access a service entity providing service when using the network content, a service entrance of the service entity needs to be arranged in the network content of the platform. In the prior art, service entrance is mainly set up in the following two ways:

The first way is manual setting, which requires the service to be created before the content entity, so as to bind the two services when adding; after service creation, services need to be presented in the published content, and need to be opened one by one for association. This method has high labor cost and low efficiency.

The second way is algorithm recommendation, which requires an establishment of complex recommendation algorithm in the early stage to extract system labels from service entities and content entities, and this process requires long-term algorithm debugging and observation; every time the algorithm changes cannot be directly explained because of the mathematical model intermediate state. In the medium and small data model, it will show inaccuracy and the risk of unpredictable process.

The above two ways are not suitable for electronic components e-commerce platform.

BRIEF SUMMARY OF THE INVENTION

Technical Issue

The technical problem to be solved by the present invention is to provide a recommendation method for an internal service entity service entrance of a network platform. aiming at the defects of the prior art.

Solution to the Issue

Technical Solution

The technical scheme adopted by the invention to solve the technical problem is as follows: a recommendation method for an internal service entity service entrance of a network platform is constructed, wherein the network platform comprises a plurality of service entities for providing services, and each service entity corresponds to a service entrance; the method comprises the following steps:
   S1, sending service keywords of each service entity as a word source of the tokenizer to a tokenizer of the network platform;
   S2, sending a core corpus corresponding to each network content in the network platform to the tokenizer, wherein the core corpus is the core content of the network content;
   S3, carrying out word segmentation on that core corpus by the tokenizer, and matching with the service keywords after the word segmentation is completed;
   and S4, if the participle of the core corpus is matched with the service keywords, setting a service entrance of a service entity corresponding to the matched service keywords in the network content corresponding to the core corpus.

Further, in the recommendation method for an internal service entity service entrance of a network platform according to the present invention, the service keywords in step S1 carries the service entrance corresponding to the service entity;
   in the step S2, the core corpus carries an address information corresponding to the network content;
   the step S4 of setting the service entrance of the service entity corresponding to the matched service keywords in the network content corresponding to the core corpus comprises setting the service entrance carried by the service keywords in the network content corresponding to address information carried by the core corpus.

Further, in the recommendation method for an internal service entity service entrance of a network platform according to the present invention, the step of setting the service entrance carried by the service keywords in the network content corresponding to the address information carried by the core corpus comprises:
   setting a service entrance carried by that service keywords in a matching position in the network content correspond to the address information carried by the core corpus, wherein the matching position is the position of the participle of the core corpus matched with the service keywords in the network content.

Further, in the recommendation method for an internal service entity service entrance of a network platform according to the present invention, in step S4:
   if the service keywords matched with the participle of the core corpus belong to a plurality of service entities, setting a service entrance of the service entity with the highest matching degree in the network content corresponding to the core corpus.

Further, in the recommendation method for an internal service entity service entrance of a network platform of the present invention, the service entity with the highest matching degree is the service entity with the largest number of matching service keywords; or
   the service entity with the highest matching degree is the service entity with the largest weight value.

Further, in the recommendation method for an internal service entity service entrance of a network platform according to the present invention, in step S4:
   if the service keywords matched with the participle of the core corpus belongs to a plurality of service entities, setting service entrances of a plurality of the service entities in the network content corresponding to the core corpus.

Further, in the recommendation method for an internal service entity service entrance of a network platform according to the present invention, the step of setting service entries of a plurality of the service entities in the network content corresponding to the core corpus comprises:
   sorting all that service entities according to the quantity of the matched service keywords, and setting the service entries of the plurality of the service entities in the network content corresponding to the core corpus according to a sorting result; or
   sorting all the service entities according to the size of the weight value of the service entities, and setting service entries of the plurality of the service entities in the network content corresponding to the core corpus according to a sorting result.

Further, in the recommendation method for an internal service entity service entrance of a network platform according to the present invention, after the step S1, the method further comprises:

if a certain service entity is deleted, deleting the service keywords of the service entity in the tokenizer, and deleting the service entrance of the service entity in the network content.

Further, in the recommendation method for an internal service entity service entrance of a network platform according to the present invention, after the step S1, the method further comprises:

if the service content is changed after a certain service entity sends the service keywords to the tokenizer, need to changing the corresponding service keywords in the tokenizer.

Further, in the recommendation method for an internal service entity service entrance of a network platform according to the present invention, the step of changing the corresponding service keywords in the tokenizer comprises:

A1. if the service entity adds a new service content, the service keywords corresponding to the newly added service content and a newly added instruction are sent to the tokenizer, and the word source of the tokenizer adds a newly added service keyword;

A2, if the service entity reduces an existing service content, sending the service keywords corresponding to the reduced service content and a reduction instruction to the tokenizer, wherein the tokenizer deletes the corresponding service keywords in the word source of the tokenizer;

A3. if the sending part of an existing service content of the service entity is changed, the service keywords corresponding to the changed content and a modification instruction are sent to the tokenizer, and the tokenizer modifies the existing service keywords in the word source of the tokenizer.

Further, in the recommendation method for an internal service entity service entrance of a network platform according to the present invention, after the step S2, the method further comprises:

if a certain network content is deleted, deleting the core corpus of the network content in the tokenizer.

Further, in the recommendation method for an internal service entity service entrance of a network platform according to the present invention, after the step S2, the method further comprises:

if the core content changes after a certain network content sends the core corpus to the tokenizer, need to changing the corresponding core corpus in the tokenizer.

Further, in the recommendation method for an internal service entity service entrance of a network platform according to the present invention, the step of changing the corresponding core corpus in the tokenizer comprises:

B1, if new content is added to the network content, sending the new content as a core corpus to the tokenizer;

B2, if part of exist content in the network content is delete, deleting the core corpus corresponding to the deleted content by the tokenizer;

B3. if the network content modifies part of the content, modifying the core corpus corresponding to the modified content by the tokenizer.

Further, in the recommendation method for an internal service entity service entrance of a network platform of the present invention, the service keywords are the main service content of the service entity, and the service keywords comprise one or more of a service range, a service characteristic, and an adaptive commodity category.

Further, in the recommendation method for an internal service entity service entrance of a network platform of the present invention, the core corpus comprises one or more of a title, an abstract, a keyword, a text, and a content type of the network content.

Further, in the recommendation method for an internal service entity service entrance of a network platform of the present invention, the network platform is an electronic component e-commerce platform.

Beneficial Effects of the Invention

Beneficial Effects

The recommendation method for an internal service entity service entrance of a network platform has the advantages that the network content and the service entity in the network platform are automatically, quickly and accurately connected by relying on a tokenizer technology, so that a user can conveniently and quickly check the service entity, and user experience is improved.

BRIEF DESCRIPTION OF THE SEVERAL VIEWS OF THE DRAWINGS

Description the Drawings

Brief description of that drawing the invention will now be further described by way of example with reference to the accompany drawings in which.

DETAILED DESCRIPTION OF THE INVENTION

Embodiments of the Invention

For a clearer understanding of the technical features, objects and effects of the present invention, a detailed description will now be given of specific embodiments of the present invention with reference to the accompanying drawings.

Embodiment 1

Figure 1:
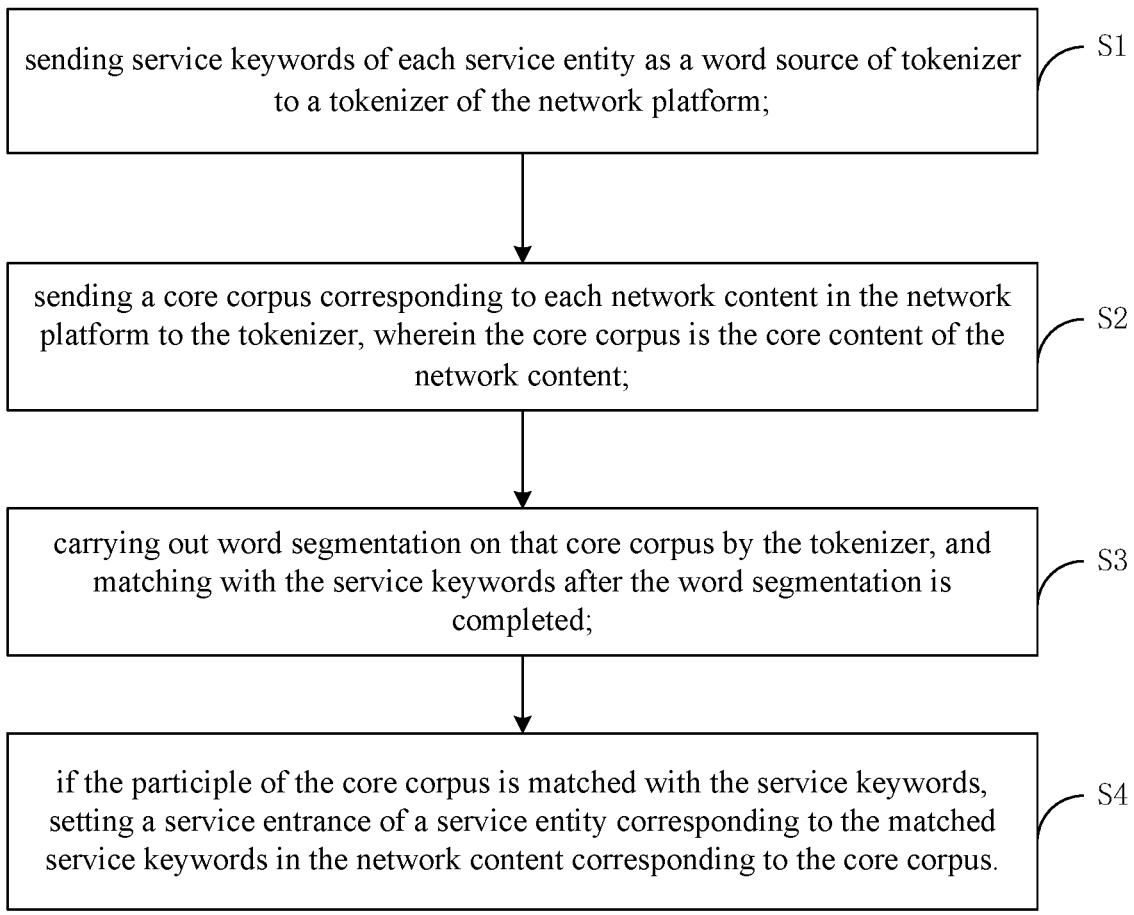
FIG. 1 is a flowchart of a recommendation method for an internal service entity service entrance of a network platform provided in Embodiment 1.

Referring to FIG. 1, the recommendation method for an internal service entity service entrance of a network platform according to this embodiment is applied to the inside of the network platform, that is, the association and intercommunication of the data inside the network platform. The network platform comprises a plurality of service entities for providing services, each service entity corresponds to a service entrance, a user can be quickly linked to the service entity through a service entrance arranged in other places, and the linking mode of the service entrance can refer to a prior art; each service entity provides service keywords according to its own service content, but it needs to ensure that these service keywords can accurately reflect the service content of the service entity. It can be understood that the service keywords of a service entity can be one or more. In addition, the network platform also comprises a plurality of network contents, wherein the network contents can be webpages, data files and the like, the core corpus of each network content is the core content of the network content, each network content provides the core corpus according to the content of the network content, and it needs to ensure that the service contents of the service entity can be accurately reflected by the core corpora. For example, the network platform is an electronic component e-commerce platform, and the electronic component e-commerce platform is used for electronic component trading, and comprises a plurality of service entities which provide functions such as electronic component inquiry, comparison, collection, trading and the like, as well as network contents such as electronic component display webpages, search result webpages, electronic component related materials and the like. Specifically, the recommendation method for an internal service entity service entrance of a network platform comprises the following steps:

S1, sending service keywords of each service entity as the word source of tokenizer to a tokenizer of the network platform. The word segmentation principle of the tokenizer of this embodiment can refer to the prior art, and is not described again here. Each service entity provides service keywords according to its own service content, but it needs to ensure that these service keywords can accurately reflect the service content of the service entity.

Alternatively, in the recommendation method for an internal service entity service entrance of a network platform in this embodiment, after the step S1, the method further comprises: if a certain service entity is deleted, deleting the service keywords of the service entity in the tokenizer, and deleting the service entrance of the service entity in network content. Alternatively, the service keywords include, but are not limited to, service scope, service characteristics, adapted commodity categories, etc. which can be set according to the specific service content of the service entity.

Alternatively, in the recommendation method for an internal service entity service entrance of a network platform in this embodiment, after step S1, the method further comprises: if the service content is changed after a certain service entity sends its service keywords to the tokenizer, the corresponding service keywords in the tokenizer needs to be changed:

A1. if the service entity adds a new service content, the service keywords corresponding to the newly added service content and a newly added command are sent to the tokenizer, and the word source of the tokenizer adds the newly added service keyword.

A2. If the service entity reduces an existing service content, the service keywords corresponding to the reduced service content and a reduction instruction are sent to the tokenizer, and the tokenizer deletes the corresponding service keywords in the word source of the tokenizers.

A3. If the sending part of an existing service content of the service entity is changed, the service keywords corresponding to the changed content and a modification instruction are sent to the tokenizer, and the tokenizer modifies the existing service keywords in the word source of the tokenizer.

And S2, sending that core corpus corresponding to each network content in the network platform to a tokenizer, wherein the core corpus is the core content of the network content. The core corpus of each network content is the core content of the network content, and each network content provides the core corpus according to its own content, but it needs to ensure that the core corpus can accurately reflect the service content of the service entity. As an alternative, the core corpus includes not only the title, abstract, keywords, body and content type of the network content, but also the targeted selection according to the network content.

Alternatively, in the recommendation method for an internal service entity service entrance of a network platform in this embodiment, after step S2, the method further comprises: if a certain network content is deleted, deleting the core corpus of the network content in the tokenizer.

Alternatively, in the recommendation method for an internal service entity service entrance of a network platform in this embodiment, after step S2, the method further comprises: if the core content is changed after a certain network content sends its core corpus to the tokenizer, the corresponding core corpus in the tokenizer needs to be changed:

B1. if new content is added to the network content, sending the new content as a core corpus to the tokenizer.

B2, If part of exist content in the network content is delete, deleting the core corpus corresponding to the deleted content by the tokenizer.

B3. If the network content modifies part of the content, modifying the core corpus corresponding to the modified content by the tokenizer.

S3, caring out word segmentation on that core corpus by the tokenizer, and matching with the service keywords after the word segmentation is completed. The word segmentation method and process of the tokenizer can refer to the prior art, and this embodiment is not repeated. The core corpus is segmented into single words, and these words are matched with the service keywords.

And S4, if the participle of the core corpus is matched with the service keywords, setting a service entrance of the service entity corresponding to the matched service keywords in the network content corresponding to the core corpus.

Specifically, because the service contents of different service entities are partially the same, or the contents of some network contents involve multiple service entities, the core corpus of one network content may match multiple service entities:

And if the service keywords matched with the participle of the core corpus belong to a plurality of service entities, setting a service entrance of the service entity with the highest matching degree in the network content corresponding to the core corpus. Alternatively, the service entity with the highest matching degree may be the service entity with the largest number of matching service keywords; or the service entity with the highest matching degree is the service entity with the largest weight value.

And if the service keywords matched with the participle of the core corpus belong to a plurality of service entities, setting service entries of a plurality of service entities in the network content corresponding to the core corpus. Further, setting service entries of a plurality of the service entities in the network content corresponding to the core corpus comprises: sorting all the service entities according to the quantity of the matched service keywords, and setting the service entries of the plurality of service entities in the network content corresponding to the core corpus according to a sorting result; or sorting all the service entities according to size of the weight values of the service entities, setting service entries of a plurality of service entities in the network content corresponding to the core corpus according to the sorting result.

In that embodiment of the invention, the network content and the service entity in the network platform are automatically, quickly and accurately connected by means of a tokenizer technology, so that a user can conveniently and quickly check the service entity, and user experience is improved.

Embodiment 2

Figure 2:
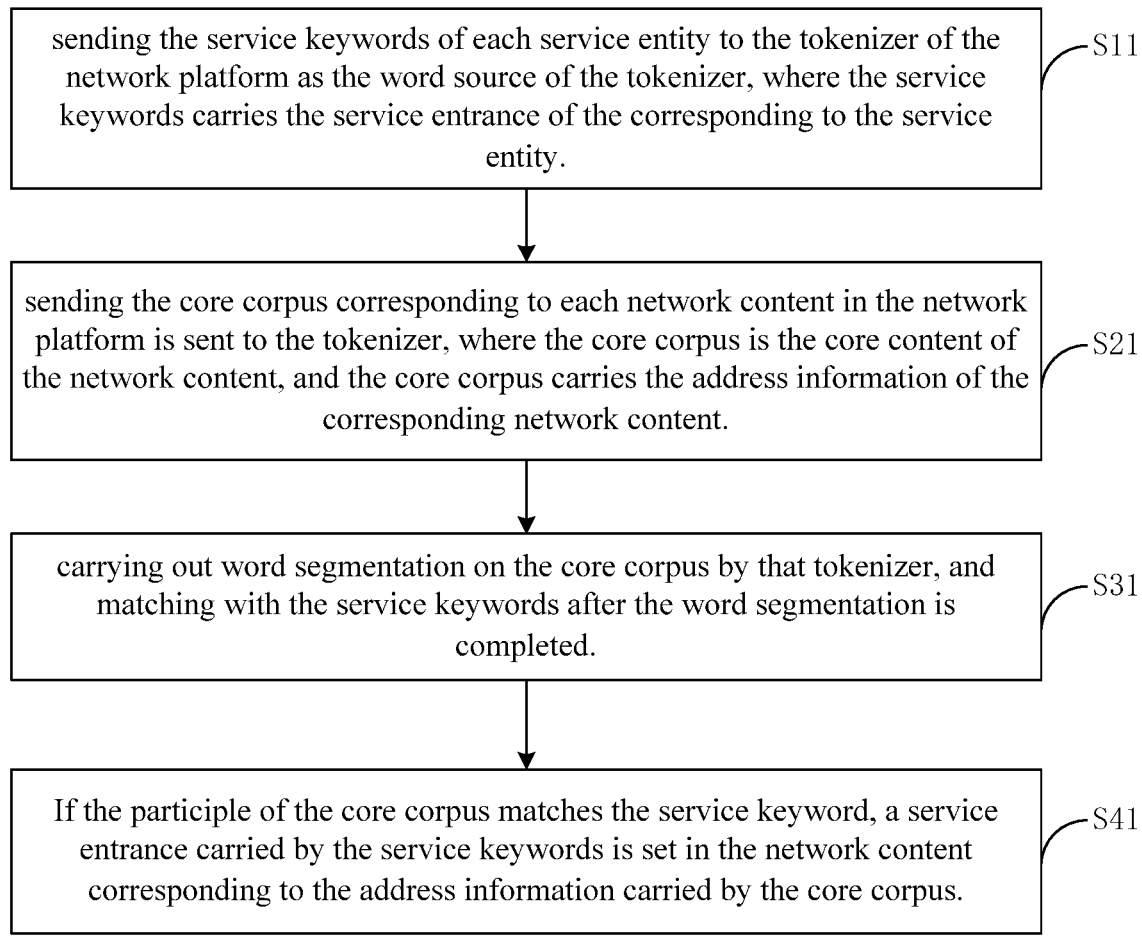
FIG. 2 is a flowchart of a recommendation method for an internal service entity service entrance of a network platform provided in Embodiment 2.

Referring to FIG. 2, the recommendation method for an internal service entity service entrance of a network platform according to this embodiment is applied to the inside of the network platform, that is, the association and intercommunication of the data inside the network platform. The network platform comprises a plurality of service entities for providing services, each service entity corresponds to a service entrance, a user can be quickly linked to the service entity through a service entrance arranged in other places, and the linking mode of the service entrance can refer to a prior art; each service entity provides service keywords according to its own service content, but it needs to ensure that these service keywords can accurately reflect the service content of the service entity. It can be understood that the service keywords of a service entity can be one or more. In addition, the network platform also comprises a plurality of network contents, wherein the network contents can be webpages, data files and the like, the core corpus of each network content is the core content of the network content, each network content provides the core corpus according to the content of the network content, and it needs to ensure that the service contents of the service entity can be accurately reflected by the core corpora. For example, the network platform is an electronic component e-commerce platform, and the electronic component e-commerce platform is used for electronic component trading, and comprises a plurality of service entities which provide functions such as electronic component inquiry, comparison, collection, trading and the like, as well as network contents such as electronic component display webpages, search result webpages, electronic component related materials and the like. Specifically, the recommendation method for an internal service entity service entrance of a network platform comprises the following steps:

S11. sending the service keywords of each service entity to the tokenizer of the network platform as the word source of the tokenizer, where the service keywords carry the service entrance of the corresponding to the service entity.

Step S21: sending the core corpus corresponding to each network content in the network platform is sent to the tokenizer, where the core corpus is the core content of the network content, and the core corpus carries the address information of the corresponding network content.

S31. carrying out word segmentation on the core corpus by that tokenizer, and matching with the service keywords after the word segmentation is completed.

S41. If the particle of the core corpus matches the service keyword, a service entrance carried by the service keywords is set in the network content corresponding to the address information carried by the core corpus.

Specifically, the service entrance carried by the service keywords is set at the matching position in the network content corresponding to the address information carried by the core corpus, wherein the matching position is the position of the particle of the core corpus matched with the service keywords in the network content.

In that embodiment of the invention, the network content and the service entity in the network platform are automatically, quickly and accurately connected by means of a word divide technology, so that a user can conveniently and quickly check the service entity, and user experience is improved.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example components and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. A recommendation method for an internal service entity service entrance of a network platform, wherein the network platform comprises a plurality of service entities for providing services, and said each service entity corresponds to a service entrance; the recommendation method comprises the following steps:
   S1, sending service keywords of said each service entity as a word source of the tokenizer to the tokenizer of the network platform;
   S2, sending a core corpus corresponding to each network content in the network platform to the tokenizer, wherein the core corpus is the core content of the network content;

S3, carrying out word segmentation on the core corpus by the tokenizer, and matching with the service keywords after the word segmentation is completed;

and S4, if the participle of the core corpus is matched with the service keywords, setting a service entrance of a service entity corresponding to the matched service keywords in the network content corresponding to the core corpus.

2. The recommendation method for the internal service entity service entrance of the network platform according to claim 1, wherein the service keywords in step S1 carries a service entrance corresponding to the service entity;

in the step S2, the core corpus carries an address information corresponding to the network content;

the step S4 of setting the service entrance of the service entity corresponding to the matched service keywords in the network content corresponding to the core corpus comprises setting the service entrance carried by the service keywords in the network content corresponding to address information carried by the core corpus.

3. The recommendation method for the internal service entity service entrance of the network platform according to claim 2, wherein the step of setting the service entrance carried by the service keywords in the network content corresponding to the address information carried by the core corpus comprises:

setting a service entrance carried by the service keywords in a matching position in the network content correspond to the address information carried by the core corpus, wherein the matching position is the position of the participle of the core corpus matched with the service keywords in the network content.

4. The recommendation method for the internal service entity service entrance of the network platform according to claim 1, wherein in step S4:

if the service keywords matched with the participle of the core corpus belong to the plurality of service entities, setting a service entrance of the service entity with the highest matching degree in the network content corresponding to the core corpus.

5. The recommendation method for the internal service entity service entrance of the network platform according to claim 4, wherein the service entity with the highest matching degree is the service entity with the largest number of matched service keywords; or the service entity with the highest matching degree is the service entity with the largest weight value.

6. The recommendation method for the internal service entity service entrance of the network platform according to claim 1, wherein in step S4:

if the service keywords matched with the participle of the core corpus belongs to the plurality of service entities, setting service entries of a plurality of the service entities in the network content corresponding to the core corpus.

7. The recommendation method for the internal service entity service entrance of the network platform according to claim 6, wherein the step of setting service entries of the plurality of the service entities in the network content corresponding to the core corpus comprises:

sorting all that service entity according to the quantity of the matched service keywords, and setting service entries of the plurality of the service entity in the network content corresponding to the core corpus according to a sorting result; or sorting all the service entities according to the size of the weight value of the service entity, and setting service entries of the plurality of the service entities in the network content corresponding to the core corpus according to a sorting result.

8. The recommendation method for the internal service entity service entrance of the network platform according to claim 1, wherein after the step S1, the recommendation method further comprises:

if a certain service entity is deleted, deleting the service keywords of the service entity in the tokenizer, and deleting the service entrance of the service entity in the network content.

9. The recommendation method for the internal service entity service entrance of the network platform according to claim 1, wherein after the step S1, the recommendation method further comprises:

if the service content is changed after a certain service entity sends the service keywords to the tokenizer, need to changing the corresponding service keywords in the tokenizer.

10. The recommendation method for the internal service entity service entrance of the network platform according to claim 9, wherein the step of changing the corresponding service keywords in the tokenizer comprises:

A1, if the service entity adds a new service content, the service keywords corresponding to the newly added service content and a newly added instruction are sent to the tokenizer, and the word source of the tokenizer adds the newly added service keywords;

A2, if the service entity reduces the existing service content, sending the service keywords corresponding to the reduced service content and a reduction instruction to the tokenizer, wherein the tokenizer deletes the corresponding service keywords in the word source of the tokenizer;

A3, if the sending part of an existing service content of the service entity is changed, the service keywords corresponding to the changed content and a modification instruction are sent to the tokenizer, and the tokenizer modifies the existing service keywords in the word source of the tokenizer.

11. The recommendation method for the internal service entity service entrance of the network platform according to claim 1, wherein after the step S2, the recommendation method further comprises:

if a certain network content is deleted, deleting the core corpus of the network content in the tokenizer.

12. The recommendation method for the internal service entity service entrance of the network platform according to claim 1, wherein after the step S2, the recommendation method further comprises:

if the core content changes after a certain network content sends the core corpus to the tokenizer, need to changing the corresponding core corpus in the tokenizer.

13. The recommendation method for the internal service entity service entrance of the network platform according to claim 12, wherein the step of changing the corresponding core corpus in the tokenizer comprises:

B1, if new content is added to the network content, sending the new content as the core corpus to the tokenizer;

B2, if part of exist content in the network content is delete, deleting the core corpus corresponding to the deleted content by the tokenizer;

B3. if the network content modifies part of the content, modifying the core corpus corresponding to the modified content by the tokenizer.

14. The recommendation method for the internal service entity service entrance of the network platform according to claim 1, wherein the service keywords are a main service content of the service entity, and the service keywords comprises one or more of a service range, a service characteristic, and an adaptive commodity category.

15. The recommendation method for the internal service entity service entrance of the network platform according to claim 1, wherein the core corpus comprises one or more of a title, an abstract, a keyword, a text, and a content type of the network content.

16. The recommendation method for the internal service entity service entrance of the network platform according to claim 1, wherein the network platform is an electronic component e-commerce platform.

* * * * *